United States Patent [19]

Fennel et al.

[11] Patent Number: 4,718,736

[45] Date of Patent: Jan. 12, 1988

[54] ARRANGEMENT FOR CONTROLLING THE PRESSURE REDUCTION BY MEANS OF AN ANTI-LOCK BRAKE SYSTEM

[75] Inventors: Helmut Fennel, Bad Soden; Hans Wupper, Friedrichsdorf, both of Fed. Rep. of Germany

[73] Assignee: Alfred Teves GmbH, Frankfurt am Main, Fed. Rep. of Germany

[21] Appl. No.: 876,736

[22] Filed: Jun. 20, 1986

[30] Foreign Application Priority Data

Jun. 21, 1985 [DE] Fed. Rep. of Germany ........ 3522226

[51] Int. Cl.$^4$ .............................................. B60T 8/70
[52] U.S. Cl. .................................... 303/111; 303/105; 364/426
[58] Field of Search ........................ 303/93, 96, 97, 99, 303/103, 105, 106, 109, 111; 364/426

[56] References Cited

U.S. PATENT DOCUMENTS

| | | |
|---|---|---|
| 3,398,995 | 8/1968 | Martin . |
| 3,806,205 | 4/1974 | Hida et al. ............................ 303/96 |
| 3,887,240 | 6/1975 | Leiber et al. .......................... 303/111 |
| 4,320,459 | 3/1982 | Lindemann et al. ................. 303/111 |
| 4,466,066 | 8/1984 | Saumweber et al. ........... 303/111 X |
| 4,632,467 | 12/1986 | Kircher et al. ..................... 303/111 |

FOREIGN PATENT DOCUMENTS

| | | |
|---|---|---|
| 1914765 | 10/1970 | Fed. Rep. of Germany . |
| 1438055 | 6/1976 | United Kingdom . |
| 1458711 | 12/1976 | United Kingdom . |
| 2136901 | 9/1984 | United Kingdom . |

*Primary Examiner*—Duane A. Reger
*Attorney, Agent, or Firm*—James B. Raden; Robert P. Seitter

[57] ABSTRACT

To modulate the pressure reduction when controlling wheel slip by means of an anti-lock hydraulic brake system, electric signals representative of the rotational behavior of the individual wheels are reconditioned and combined electronically. Upon the occurrence of a tendency to lock, a pressure-reducing valve (17, 17', 19, 19', 21, 21') is actuated pulsewise, and thereby pressure fluid out of the wheel brake cylinder is returned into a supply reservoir (11). When varying the pulse/pulse-pause ratio of the actuating signals ($i_{AV}$), additionally the pressure/time characteristic curve of the brake system is taken into consideration by increasing the pulse/pulse-pause ratio after a predetermined period of time, that is time of pressure reduction or number of pulses, with the pressure-reducing signal continuing to exist. The change in the actuating signals ($i_{AV}$) for the improvement of the pressure reduction is effected in one or in several steps or quasi-continuously.

3 Claims, 5 Drawing Figures

ARRANGEMENT FOR CONTROLLING THE PRESSURE REDUCTION BY MEANS OF AN ANTI-LOCK BRAKE SYSTEM

BACKGROUND OF THE INVENTION

The present invention relates to a method for modulating the pressure reduction when controlling the wheel slip by means of an anti-lock hydraulic brake system. Electric signals representative of the wheel rotational behavior are generated, reconditioned and electronically processed. For slip control, or upon the occurrence of a tendency to lock, a pressure control valve is actuated pulsewise and thereby pressure fluid out of the wheel brake cylinder of the wheel concerned will be returned to a pressure compensating reservoir. The braking pressure variation is conformed to the wheel rotational behavior by varying the pulse/-pulse-pause ratio of the valve-actuating signals.

Anti-lock hydraulic brake systems for vehicles are known which contain wheel sensors enabling generation of electric signals indicative of the wheel rotational behavior. Inserted into the pressure fluid lines from the braking pressure generator to the wheel brake cylinders are solenoid valve assemblies composed of an inlet valve and an outlet valve. The assemblies serving to keep the braking pressure constant or to reduce it upon an imminent locked condition. In this arrangement, the velocity or the gradient of the braking pressure build-up and reduction is varied by means of pulse-shaped valve-actuating signals, the pulse/-pulse-pause ratio of which is variable between zero and infinity as a function of the wheel motional behavior (German patent specification No. 19 14 765). The pressure against time discharge characteristic curve or the pressure variation in the phase of pressure reduction is not considered or only considered indirectly and thus to an insufficient degree. Due to the known nonlinearity of the pressure/time characteristic curve of a brake system, there occurs a very rapid initial pressure reduction while later the pressure/time characteristic curve extends very flatly. The initially very high pressure-reduction amplitude makes it difficult to exactly meter the pressure reduction and favors the tendency of the wheel suspension to oscillate. Further, driving comfort suffers from the initially very high amplitudes by which the pressure is varying. In particular, on slippery roads the slow pressure reduction in the lower range of the pressure/time characteristic curve proves to be a disadvantage.

Therefore it is an object of the present invention to overcome the disadvantages described and to develop a method for the control of an anti-lock hydraulic brake system which, for regulation of wheel slip, enables attainment of a finer proportioning of the pressure reduction and a better adaptation of the pressure to the various frictional coefficients, road conditions and situations.

SUMMARY OF THE INVENTION

This object is achieved in a straightforward and technically advanced fashion by a method of the type initially referred to but in a manner such that on actuation of the pressure-reducing valves (that is on variation of the pulse/pulse-pause ratio of the actuating signals) additionally the pressure/time characteristic curve of the brake system, which means the characteristic-responsive pressure variation in the reduction phase, is taken into consideration by increasing the pulse/pulse-pause ratio. This includes the interval of excitation of the pressure-reducing valve and thus the duration of the pulses in relation to the pulse pauses, after a predetermined period of time, and after a predetermined period of pressure reduction, after a predefined number of pulses of the actuating signals or the like, with the pressure-reducing signal continuing to exist.

An arrangement for practicing the present invention, is used to modulate the pressure reduction when controlling the wheel slip by means of an anti-lock hydraulic brake system. The system comprises a braking pressure generator, a pressure supply reservoir as well as wheel brake cylinders, and in the pressure fluid lines whereof electromagnetically actuated pressure control valves are inserted by which the normally opened pressure fluid conduit from the braking pressure generator to the wheel brake cylinders is adapted to switch over to the closed condition. The normally closed pressure fluid return line from the wheel brake cylinders to the pressure supply reservoir is adapted to switch over to the opened condition. Sensors are provided for the generation of electric signals representative of the wheel rotational behavior as well as hard-wired or programmed electronic circuits for the logic combining and processing of the sensor signals and for the generation of the valve control signals. The velocity of pressure reduction, the residual pressure, the (mean value of) braking pressure variation or braking pressure gradient are controllable by pulsewise actuation of the valves in the pressure fluid return line and by variation of the pulse/pulse-pause ratio or the pulse width as a function of the wheel rotational behavior. The improvement resides in that the actuation of the pressure control valves in the phase of pressure reduction, which means the duration and/or timely distance of the phases of the valves' opened and closed condition, is variable as a function of the pressure variation in the phase of pressure reduction.

Hence, the present invention provides a method which eliminates the detrimental effects of the non-linear pressure against time discharge characteristic curves of a brake system (that is, the non-linear pressure reduction against time) without increasing manufacturing efforts and solely by correspondingly dimensioning or programming the electronic combining circuit. In contrast to known methods and arrangements, it is not only wheel-related reference values which the present invention uses as input values for the determination of the valve-actuating signals when controlling the pressure reduction in connection with a brake slip control action, but likewise control variables dependent on the pressure characteristic curve of the hydraulic brake system. The pressure-reduction algorithm can be improved considerably by taking the characteristic curve of a hydraulic brake into consideration in this manner. The tendency of the wheel suspension to oscillate which ensues from marked changes in the pressure amplitude at high friction coefficients can be counteracted by the precise proportioning of pressure in consideration of the pressure/time characteristic curve of the brake system. The driving comfort is likewise augmented by the finer and more precise pressure modulation. The auxiliary hydraulic energy required for slip control, which must be made available by the pump or the hydraulic accumulator of a conventional hydraulic brake system, will be reduced. The accelerated pressure reduction during control actions at a relatively low pressure level, for instance on very slippery roads, is likewise of great advantage. Consequently, the present invention accomplishes a considerable improvement of slip control both at a high and at a low coefficient of friction.

BRIEF DESCRIPTION OF THE DRAWING

Further features and advantages of the present invention are set forth in the following description of an embodiment taken in conjunction with the accompanying drawing wherein.

DETAILED DESCRIPTION

Figure 1:
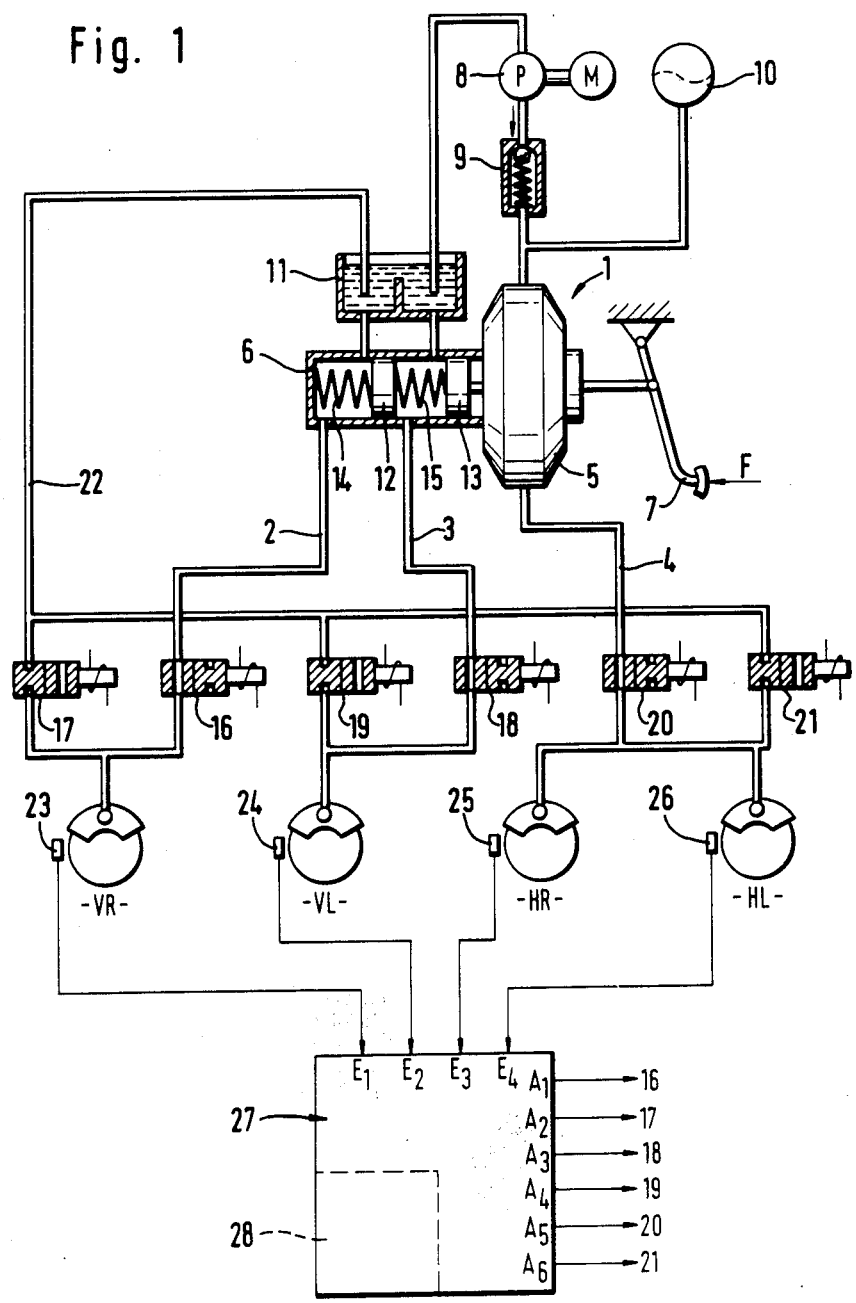
FIG. 1 is a hydraulic and electrical wiring diagram of a brake system for implementing the method of the present invention.

According to FIG. 1, an anti-lock brake system utilizing the method of controlling the pressure reduction in accordance with the present invention is composed of a braking pressure generator 1, to which three hydraulically isolated pressure fluid circuits 2, 3, 4 are connected. A hydraulic brake power booster 5 is provided which is structurally united with a tandem master cylinder 6. In the normal case, such a system allows build up of a braking pressure in the individual brake circuits 2, 3, 4 which is approximately proportional to the pedal force F acting upon a brake pedal 7. The auxiliary energy for boosting the pedal force F is taken from an auxiliary pressured source which is composed of a hydraulic pump 8 with the associated non-return valve 9 and of a pressure accumulator 10. The suction side of the pump 8 connected with a compensating and supply reservoir 11 which additionally supplies the master cylinder 6 with pressure fluid. The working pistons 12, 13 of the tandem master cyliner 6 and the associated resetting springs 14, 15 are likewise indicated in FIG. 1.

In the embodiment described herein, each of the two front wheels VR, VL are connected to one pressure fluid circuit 2, 3 of the master cylinder 6, while the two rear wheels HR, HL are connected jointly to the circuit 4 of the brake power booster 5. Each pressure fluid circuit is equipped with one pair of inlet valve and outlet valves 16, 17, 18, 19, 20, 21, with the aid of which the braking pressure in the wheel brakes of the front wheels VR, VL can be controlled individually and that in the rear wheels HR, HL concurrently. The pressure build-up is controlled through the inlet valves 16, 18, 20, which the pressure reduction is controlled through the outlet valves 17, 19, 21. Both valves 16, 17, 18, 19, 20, 21 are closed in the phase in which the pressure is kept constant.

All valves are provided as electromagnetically actuatable two-way/two-position directional valves, the inlet valves 16, 18, 20 thereof being opened in their initial position, that is as long as they are not excited, while the outlet or pressure-reducing valves 17, 19, 21 are closed in their initial position and permit pressure fluid discharge by way of the return line 22 into the compensating reservoir 11 only after they have been electromagnetically excited and changed over. Further, brake systems of this type contain valve-controlled pressure fluid conduits (not shown), through which pressure fluid out of the auxiliary-pressure supply system 8, 9, 10 is delivered into the static circuits 2, 3. This is necessary in order to top up the quantity of pressure fluid which flows off into the reservoir 11 by way of the valves 17 and 19 in the phase of pressure reduction.

In addition, each vehicle wheel VR, VL, HR, HL is furnished with a sensor 23, 24, 25, 26, for instance an inductive pickup for measuring data, for the determination of the wheel rotational behavior. The information is fed in the form of electric signals by way of signal lines to the electronic circuits comprised in the block 27, in which circuits the signals are reconditioned, processed and logically combined. In response to these sensor signals applied to the inputs E1 to E4, braking-pressured control signals are generated in block 27 which, by way of the outputs A1 to A6, are supplied to the two-way/two-position deirectional valves 16 to 21. The control signals serve to modulate or, respectively, control the braking pressure in the individual wheel brake cylinders upon the occurrence of an imminent locked condition.

Figure 2:
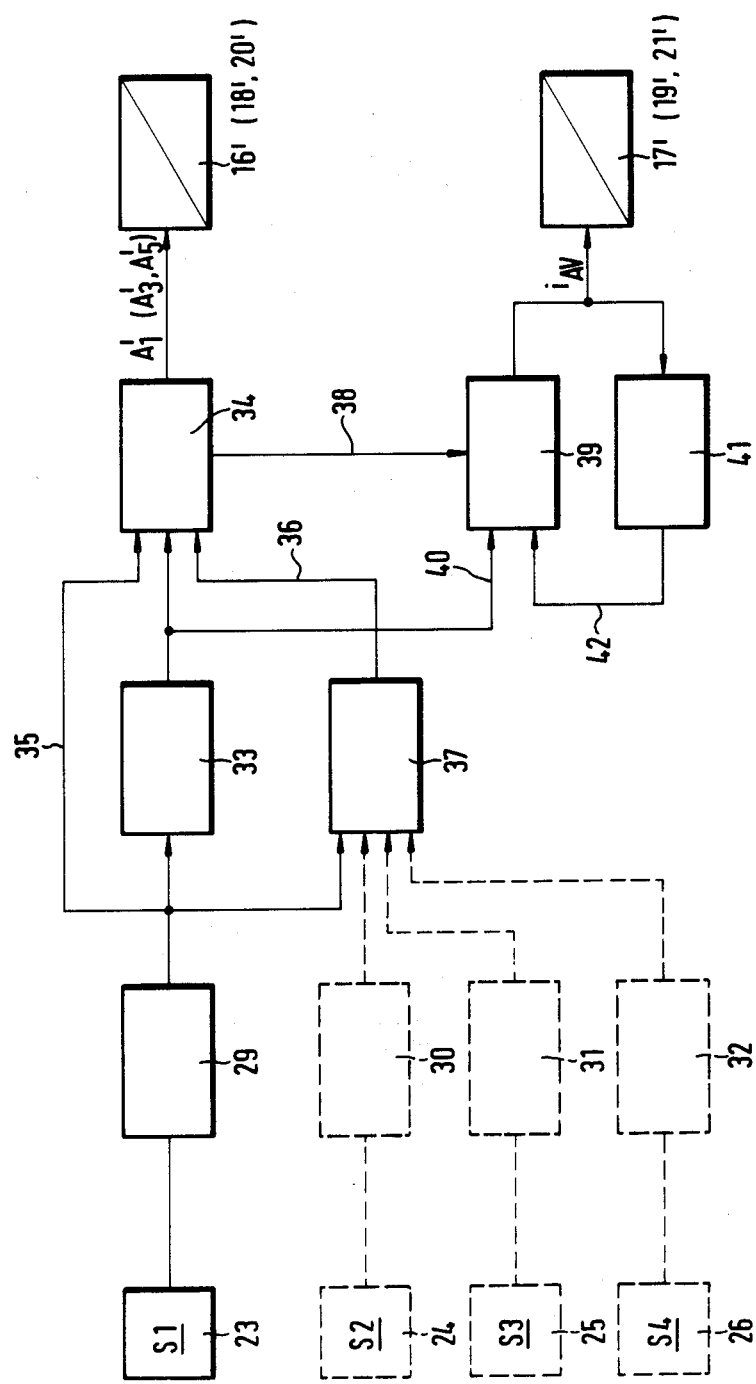
FIG. 2 is a block diagram of that part of the electronic circuit configuraton according to FIG. 1 that is used for implementing the method of the present invention.

The circuits in block 27 can be provided as hard-wired electroniclogic circuits or as programmed circuits, for instance microcomputers. A component part 28 of the electronic circuits in block 27, which is illustrated symbolically by dotted lines, serves to implement the method in accordance with the present invention. In FIG. 2, the individual function blocks of the circuit are shown in detail. Sensors $S_1$ to $S_4$ are identical with the pickups for measuring data 23 to 26 in FIG. 1. The associated signal-reconditioning circuits and other blocks, are required in the circuit 27 (compare FIG. 1) for the generation of the braking pressure control signals. One circuit with the component parts shown in FIG. 2 is needed for each control channel, apart from the component parts shown in dotted lines.

According to FIG. 2, the signal of the sensor 23 is first supplied to a speed-measuring circuit 29, wherein the signal is reconditioned, amplified and, if necessary, transformed for further processing. By differentiation in the differentiator circuit 33, a signal representative of the wheel acceleration and deceleration develops. In a combining circuit 34, the acceleration/deceleration signal is logically combined with the speed signal, supplied by way of the signal line 35 directly to the circuit 34, and with a reference value, fed to the circuit 34 via the line 36, for the purpose of generation of the braking pressure control signals. The reference value, that is the so-called vehicle reference speed, is formed in the circuit 37 from the reconditioned speed signals of all wheel sensors 23 to 26 according to a predetermined logarithm.

While the braking-pressure control signals formed in the logic circuit 34 are supplied directly to the inlet valves 16' (18', 20') via the output A'1'(A3', A5'), the signals for the actuation of the braking-pressure reducing valve 17' (19', 21') first are fed by way of a signal line 38 to a pressure-reduction modulator 39. By way of the signal line 40, the modulator 39 is moreover furnished with wheel acceleration/deceleration signals.

Besides, the output signals of the modulator 39, by means of which the outlet valves and pressure-reducing valves 17' (19', 21') are controlled, are registered by a counter 41. The counting result is likewise introduced into the pressure-reduction modulator 39 by way of the line 42.

Figure 3:
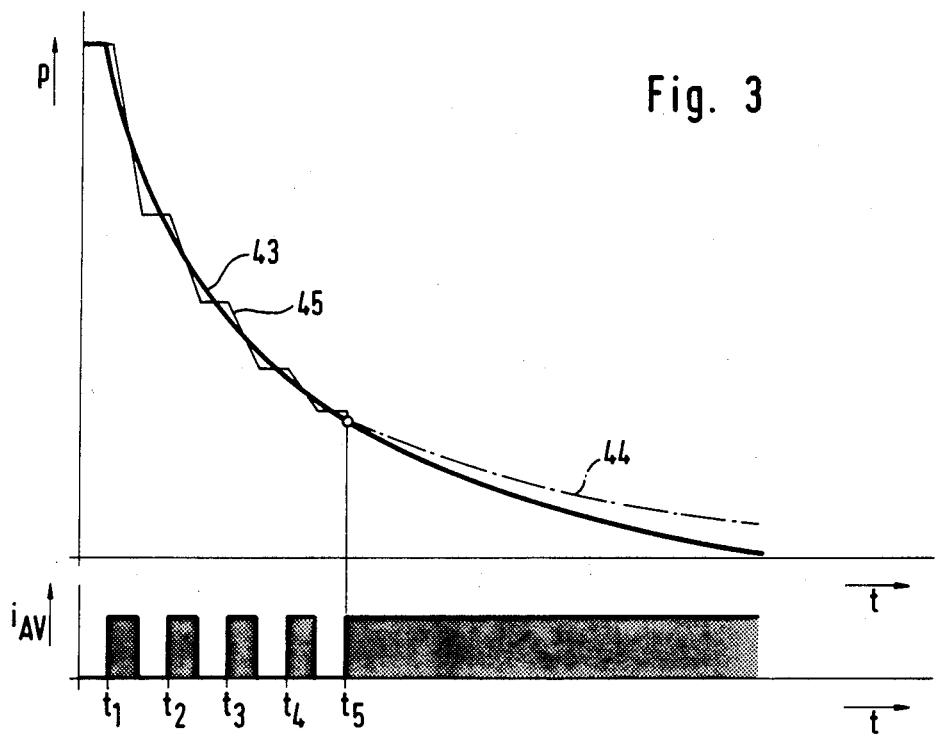
FIG. 3 is a diagram of the pressure variation and of the outlet-valve actuating signals according to one embodiment of the inventive method.
Figure 4:
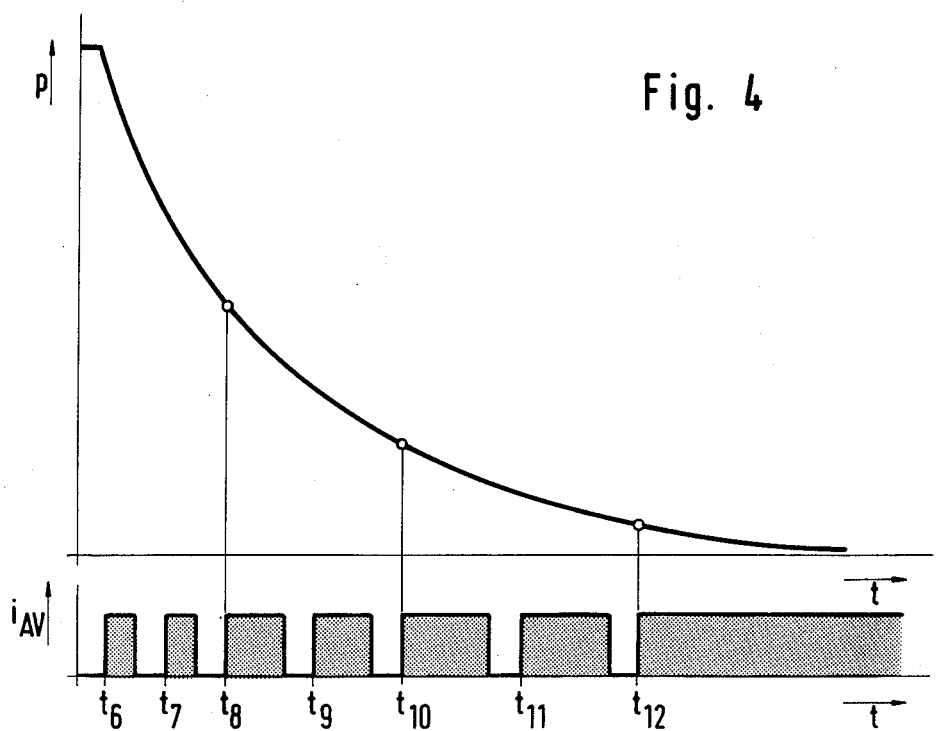
FIG. 4 is a diagram of the pressure variation and the signal course in a second embodiment of the present invention.
Figure 5:
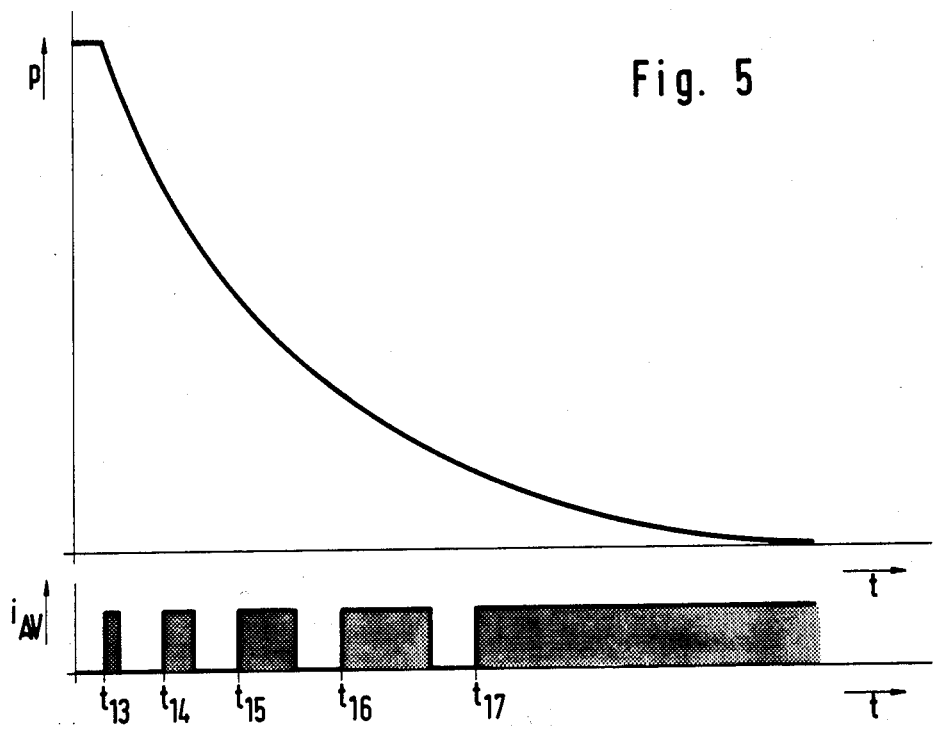
FIG. 5 is a diagram which is similar to the illustrations in FIGS. 3 and 4 and illustrating the pressure variation and the signal course in a third embodiment of the present invention.

FIGS. 3 to 5 illustrate the improvement of braking pressure reduction which is achieved by the method of the present invention and by the corresponding dimensioning of the modulator 39 according to FIG. 2. What is illustrated are the braking pressure variation and the control signals $i_{AV}$ existing at the output of the modulator 39 and serving to control the outlet valves or, respectively, pressure-reducing valves. According to FIG. 3, change-over is planned to take place at the point of time $t_5$, if the pressure-reducing signal supplied via the line 38 to the circuit 39 (compare FIG. 2) is still existing at that point of time. This is because the outlet valve which was first actuated pulsewise is continuously excited at the point of time $t_5$ until the termination of the pressure reduction.

The period of time $t_1-t_5$ until the change-over to continuous excitation is determined either by a time element or by a defined number of pulses. In the embodiment according to FIG. 3, change-over to continuous excitation is effected, if a pressure-reducing signal is still present at the commencement of the fifth pulse.

The bold-face type curve 43 in FIG. 3 represents the averaged pressure variation. Without the change-over at the point of time $t_5$, the pressure would follow the dash-dotted line 44. While the pressure drops relatively quickly in the beginning, the reduction of the residual pressure would last comparatively long without the change-over of the present invention. The finely drawn step-like curve 45 displays the actual pressure variation in the time span $t_1-t_5$ which, due to the pulsation of the outlet valve, is composed of phases with very steep pressure drop and of phases with constant pressure.

Improvement to linearity and improvement of the pressure reduction, that is retardation at the commencement of the phase of reduction and rapid approximation to the entire pressure balance, can be realized by control of the pressure reduction with several change-over points. This is shown in FIG. 4. The pressure reduction sets in at the point of time $t_6$. After two pulses of equal length (the pulse pauses remain constant) the duration of the actuating signal $i_{AV}$ will be doubled; and after two pulses, again of equal length, the pulse duration will be increased again at the point of time $t_{10}$. Thus, the pulse/pulse-pause ratio is increased stepwise in this embodiment. The change-over to continuous excitation takes place at the at the point of time $t_{12}$.

Finally, provision is made in the embodiment of this invention according to FIG. 5 to quasi continuously increase the pulse/pulse-pause ratio from the beginning of pressure reduction ($t_{13}$) until continuous excitation ($t_{17}$).

In the embodiment according to FIG. 4 and FIG. 5, instead of the counter 41, a somewhat more complicated circuit configuration is required which, in conjunction with the modulator 39, brings about the repeated change-over or the continuous prolongation of the outlet-valve actuating signals $i_{AV}$.

What is claimed is:

1. A slip-controlled brake system for automotive vehicles having vehicle wheels and wheel brake cylinders wherein pressure reduction at the wheel brakes is controlled to more closely approximate the pressure versus time characteristic curve of the brake system, wherein said characteristic curve manifests an initial steep slope temporarily followed by a gradual slope relative to said steep slope, said system comprising, in combination:

a pedal-actuated braking pressure generator including a master cylinder;

a pressure supply reservoir;

a plurality of pressure fluid lines respectively connecting each of said wheel brake cylinders with said master cylinder and said pressure supply reservoir;

a plurality of normally open electromagnetically actuated pressure control valves respectively connected in said pressure fluid lines between said master cylinder and said wheel brake cylinders;

a plurality of normally closed electromagnetically actuated pressure control valves respectively connected in said pressure fluid lines between said pressure supply reservoir and said wheel brake cylinders;

a plurality of wheel sensors respectively coupled to said wheels for providing electrical signals indicative of wheel rotational behavior;

means coupled to said sensors for providing an output signal indicative of a predetermined rotational behavior indicating the need for said pressure;

means responsive to said output signal for generating an initial series of pulses during said initial steep slope of said characteristic curve;

means responsive to said initial pulses and coupled to said normally closed valves for opening said normally closed valves during each of said initial pulses; and, means responsive to said output signal and coupled to said normally closed valves for opening said normally closed valves during said gradual slope of said characteristic curve.

2. The brake system according to claim 1, wherein each successive pair of said initial pulses is of a greater pulse duration than the preceding pair of pulses.

3. The brake system according to claim 1, wherein each successive one of said initial pulses is of a greater pulse duration than its preceding pulse.

* * * * *